United States Patent
Latham, IV et al.

[11] 3,755,810
[45] Aug. 28, 1973

[54] DUOCHROMATIC INDICATOR FOR A DIVERSITY POLARIZATION RECEIVER

[75] Inventors: George R. Latham, IV, Plainview; Winfield T. Allen, Garden City, both of N.Y.

[73] Assignee: Sperry Rand Corporation

[22] Filed: Feb. 27, 1957

[21] Appl. No.: 642,911

[52] U.S. Cl. ................. 343/5 CD, 343/100 PE
[51] Int. Cl. ............................................. G01s 7/04
[58] Field of Search ................. 343/5, 7, 9, 17, 343/100, 5 CD, 100 PE

[56] References Cited
UNITED STATES PATENTS

| | | | |
|---|---|---|---|
| 3,048,837 | 8/1962 | Hart | 343/5 CD X |
| 3,148,367 | 9/1964 | Ochiai | 343/5 CD |
| 3,268,891 | 8/1966 | Atlas | 343/5 CD X |
| 3,403,397 | 9/1968 | Harrington et al. | 343/5 CD X |

*Primary Examiner*—T. H. Tubbesing
*Attorney*—Reginald V. Craddock

EXEMPLARY CLAIM

5. Radar apparatus for receiving radar echo signals of microwave energy, said means including means having two output channels for deriving separate output signals proportional in amplitude, respectively, to the directly-polarized and cross-polarized components of the received microwave energy, a subtracter circuit coupled to the respective outputs of the receiving means for producing a signal related to the difference between the two output signals, phase inverting means coupled to the difference signal output of the subtracter means for producing two signals of opposite sense, first and second amplitude discriminating means for passing strong echo signals having amplitudes between predetermined levels, means for coupling said outputs of said receiving means to respective ones of said amplitude discriminating means, amplitude limiter means coupled to one of the outputs of said receiving means, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, a pair of cathode ray indicator tubes having different color-producing phosphor screens, the output of the first summing means being coupled to the intensity control of one indicator tube, and the output of the second summing means being coupled to the intensity control of the second indicator tube, and means for superimposing the images formed on the screens of the two indicator tubes.

9 Claims, 1 Drawing Figure

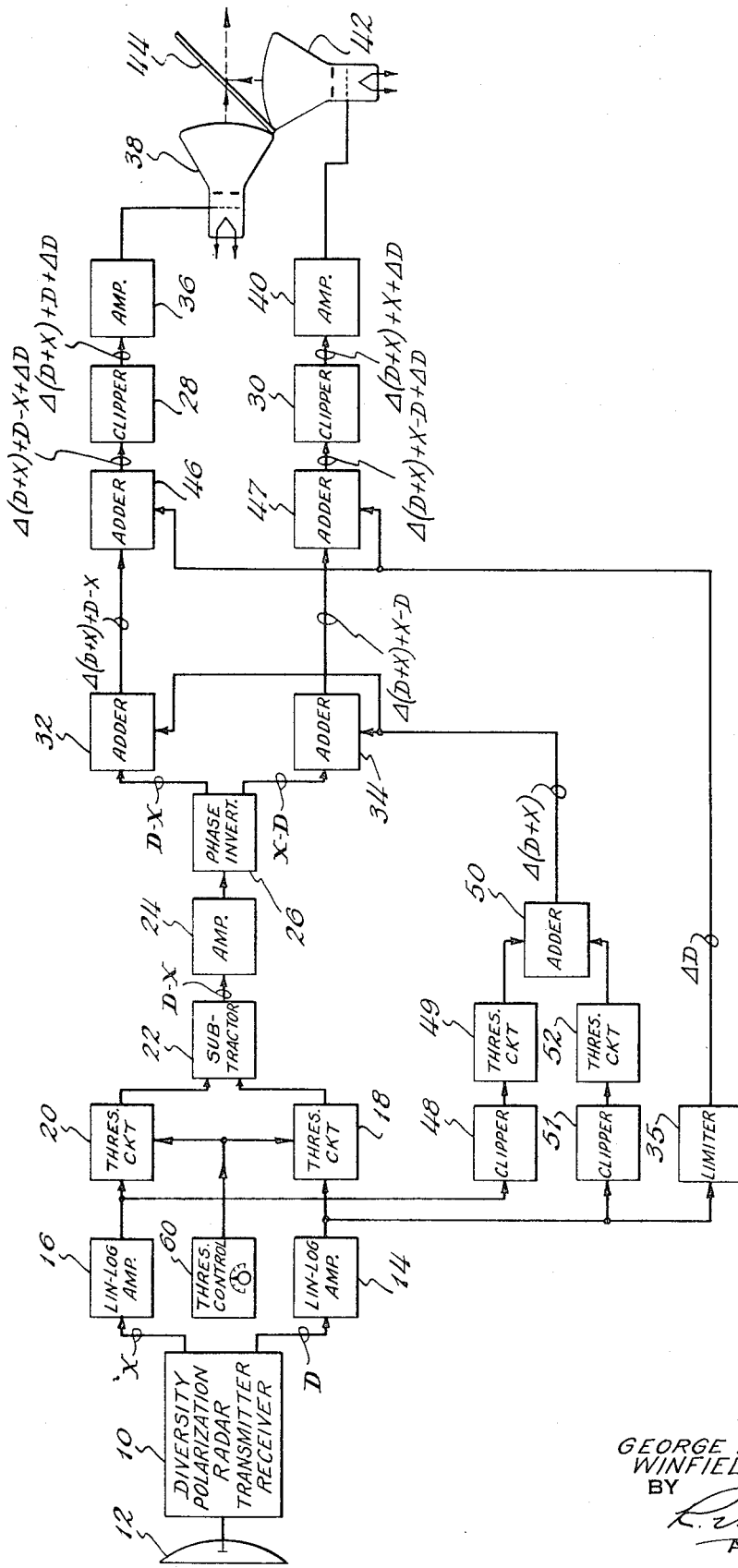

DUOCHROMATIC INDICATOR FOR A DIVERSITY POLARIZATION RECEIVER

The invention herein described was made in the course of or under a contract or subcontract thereunder, with the Department of the Air Force.

This invention relates generally to diversity polarization radar reception, and more particularly, is concerned with a duochromatic type indicator for presenting target information derived from a diversity polarization receiver.

Location of specific ground targets from conventional radar presentations is a difficult problem which frequently leads to unsuccessful operation where such presentations are employed. This difficulty stems from the fact that the conventional presentation does not give the "break up" of ground targets which is necessary for recognizing individual targets. The use of a two-tone presentation improves the situation somewhat because it permits ground mapping and large targets to appear at different intensities. In some areas this ground mapping is distinctive enough due to identifying landmarks, such as coastlines, rivers, lakes, etc. to permit accurate location of specific targets for navigation or bombing purposes. However, in many inland areas such identifying landmarks are not available, and navigation and bombing requires accurate identification of the natural and man-made targets that are present. Since these targets often appear in large complex groups, the identification of any specific target is very difficult. This latter situation is aggravated by the limited dynamic range of the phosphors which are used in long-persistence radar indicators.

By the present invention improved target recognition is achieved through the use of information derived from the diversity polarization reception (DPR) technique for identifying the ground targets more precisely than is possible by conventional radar mapping. In a DPR system the received microwave energy is resolved into two mutually orthogonal components, the directly-polarized component and the cross-polarized component. Since only objects which have very simple geometric shapes reflect incident waves without change of polarization, it is to be expected that the complex geometry of many radar targets gives rise to reflected waves of polarization characteristics considerably different from those of the incident wave. Thus all complex targets made up of irregular or non-symmetrical surfaces reflect a cross-polarized wave in addition to the one having the same polarization as the transmitted wave. Since the target has its own distinct polarization characteristics, DPR provides a means of achieving improved target identification. While the diversity polarization reception technique has been recognized heretofore, no adequate means of presenting the information derived by this technique had been developed until relatively recently.

In a co-pending application Ser. No. 540,773, now U.S. Pat. No. 3,403,397, in the names of George R. Latham, IV, and Roger C. Harrington, filed on Oct. 14, 1955, entitled Duochromatic Indicator for A Diversity Polarization Radar Receiver, and assigned to the present assignee, a solution is given to the problem of presenting diversity polarization information, contained in received target return, for purposes of distinguishing the nature of the targets. In that application, the operation of which will be described in the following in connection with the present invention, means are provided for the distinctive indication of ground clutter return and the return of targets reflecting predominantly directly-polarized signals and targets returning predominantly cross-polarized signals. For example, targets returning predominantly directly-polarized signals are indicated on a first indicator while targets returning predominantly cross-polarized signals are shown on a second indicator. By means of the distinctive color superimposing of the presentation of said two indicators, directly-polarized and cross-polarized return signal targets are distinguished by discrete colors such as red and green. Ground clutter return, on the other hand, is shown by means of a neutral color such as pale yellow (the result of superimposing small but equal amounts of red and green).

While the invention of the aforementioned co-pending application yielded a satisfactory solution of the problem of differentiating targets on the basis of their signal polarization characteristics, experience has shown that under a special circumstance, certain targets will not be indicated at all. This loss of indication occurs in the case of a large target producing a strong echo signal having large components of both directly-polarized and cross-polarized signals which may be substantially equal in magnitude. In the operation of the invention of said co-pending application, subtractive means are included which function, in the case of equal directly-polarized and cross-polarized returns to cancel out one with the other leaving no net distinctive signal for presentation on the indicator.

It is therefore a general object of the present invention to provide a diversity polarization receiver having an improved indicator.

Another object of the present invention is to provide a diversity polarization radar indicator adapted to display targets which reflect signals having strong but substantially equal directly-polarized and cross-polarized components.

An additional object of the present invention is the provision of a diversity polarization radar indicator wherein targets returning substantially equal amounts of directly-polarized and cross-polarized signal energy are distinguished from targets returning different amounts of directly-polarized and cross-polarized signal energy.

A further object of the present invention is to provide an improved indicator for a diversity polarization receiver adapted to distinguish weaker targets returning equal amounts of directly-polarized and cross-polarized signal energy from stronger targets returning equal amounts of directly-polarized and cross-polarized signal energy.

These and other objects of the invention which will become apparent as the description proceeds are achieved in a representative embodiment by the provision of a pair of cathode ray indicator tubes having phosphors of different colors, with means for superimposing the images produced on the two indicator tubes. Video signals are derived from a suitable diversity polarization receiver, the video signals corresponding respectively to the directly-polarized component and the cross-polarized component of the received microwave signals. These two component signals having an amplitude above a first predetermined threshold value are applied to a difference circuit for producing a signal proportional to the difference in amplitude of the two types of return. A limited directly-polarized component signal is then added to the subtracted output and applied to the intensity control of one of the indicator tubes. This limited directly-polarized component signal is also added to a phase inverted version of the subtracted output and applied to the intensity control of the other cathode ray indicator tube. Up to this point, the operation of the present invention parallels that of the aforementioned co-pending patent application.

The present invention further provides for the derivation of an additional signal to be applied to the intensity control grids of both cathode ray tube indicators. This additional signal is produced by monitoring the amplitudes of both said component signals, selectively passing those amplitudes of both signals lying above said first threshold value and between second and third amplitude values, and summing the passed signals.

The result is that targets (such as ground clutter) producing relatively weak returns having amplitudes below said first value are displayed on the combined indicator in a pale neutral color. Targets returning substantially equal amounts of directly-polarized and cross-polarized signals having amplitudes lying between the aforementioned second and third values are displayed on the combined indicator in a more intense neutral color, the intensity being maximum when the equal signal amplitudes reach the higher of said second and third values. Targets returning directly-polarized and cross-polarized signals of unequal amounts having amplitudes below both said second and third values are displayed on the combined indicator in one of two distinct colors depending on the nature of the stronger component. Finally, targets returning unequal amounts of directly-polarized and cross-polarized signal components where both said components have an amplitude lying between or exceeding both said second and third values, are displayed on the combined indicator in a color between said neutral and one of said two separate colors depending on the nature of the predominant signal component and the amplitude thereof.

For a better understanding of the invention, reference should be had to the accompanying drawing, wherein the single FIGURE is a block diagram of the diversity polarization receiver and indicator of the present invention.

In the drawing, the numeral 10 indicates generally a diversity polarization radar transmitter and receiver, which may be of the type described in more detail in U.S. Pat. No. 2,619,635. Microwave energy is transmitted by an antenna 12, the received energy reflected by targets back to the antenna 12 being separated by the diversity polarization radar receiver into a directly-polarized component indicated as D, and a cross-polarized component indicated as X.

Video pulses in the directly-polarized and cross-polarized component channels of the diversity polarization receiver are coupled respectively to lin-log amplifiers 14 and 16, which have a linear response to signals of small amplitude and logarithmic response to signals of large amplitude. This type of amplifier is provided to compress the wide dynamic range of targets into a narrower dynamic range which can be handled by the balance of the indicator circuit. Lin-log type of amplifiers are well known and can be found described in more detail in Volume 23 of the MIT Radiation Laboratory Series, McGraw-Hill, 1947, page 583.

The outputs of the respective lin-log amplifiers are coupled to threshold circuits 18 and 20. These threshold circuits are of the conventional diode clipping circuit type which set a threshold level which must be exceeded in amplitude by the input video signals from the lin-log amplifiers to produce an output signal. These threshold circuits are preferably made simultaneously adjustable, as generally indicated by threshold control 60, to permit control of the number of targets that appear on the indicator. This feature is useful when flying over industrial areas since the presentation may be simplified to include only outstanding targets.

The output signals from the threshold circuits 18 and 20 are coupled to a suitable subtracter circuit 22 which produces output pulses proportional to the difference in amplitude of the received video pulses from the threshold circuits 18 and 20. Such circuits for deriving an output proportional to the difference in amplitude of two input signals are well known in the art. The difference pulses are then amplified, as by an amplifier 24, and applied to a phase inverter circuit 26. Two output signals are derived from the phase inverting circuit 26, one output producing pulses of the same sense as the input pulses derived from the subtracter 22, and the other output having pulses of the opposite sense as the pulses derived from the subtracter 22.

These two output signals, which may be designated as $D - X$ and $X - D$, are applied to first inputs of adders 32 and 34. The adder circuits are well known in the art and are used to mix two inputs and derive an output proportional to the amplitude sum of the inputs. Coupled to second inputs of adders 32 and 34 is a signal derived from the output of adder 50, to be described in more detail later. The outputs of adders 32 and 34 are applied, respectively, to first inputs of adders 46 and 47, second inputs to which are derived from a diode limiter 35. Limiter 35 obtains its input from the output of lin-log amplifier 14. The output of the limiter 35 is designated $\Delta D$.

The outputs of adders 46 and 47 are applied, respectively, to clippers 28 and 30 and thence to the intensity control electrodes of cathode ray tubes 38 and 42 after suitable amplification as provided by amplifiers 36 and 40, respectively. The clipper circuits 28 and 30 are of the conventional diode type of clipper circuit and pass only positive-going pulses to facilitate D-C clamping of the indicator circuits in a well known manner.

The indicator tubes 38 and 42 are provided with suitable scanning circuits (not shown) to produce, for example, a PPI or type B target presentation. Additionally, the two tubes 38 and 42 are provided with different color phosphors. Tube 38, for example, may have red-producing phosphors and tube 42, for example, may have green-producing phosphors. The two tubes are arranged with their respective display surfaces at right angles and are directed toward dichroic mirror 44 so that the operator sees a resultant single presentation.

In the operation of the apparatus so far described, should only weak amplitude target signals be received, i.e., signals having amplitudes less than that which threshold circuits 18 and 20 will pass, these signals are passed through limiter 35 and are applied in equal amplitude to the intensity control grids of indicators 38 and 42 as a ground-mapping signal, so that said indicators will contribute equal intensities of their respective colors to the composite target presentation as derived from dichroic mirror 44 to produce a neutral or pale yellow ground-mapping indication. When the D-signal and the X-signal have unequal but sufficient amplitudes to pass threshold circuits 18 and 20, a distinctive color target indication is produced. For example, should the D-signal be greater than the X-signal, a red target appears from the indicator tube 38 whereas if the X-signal is greater than the D-signal, a green target appears from the indicator tube 42.

It will be seen, however, that the apparatus so far described will fail to present an indication for targets returning signals of sufficient amplitude to pass threshold circuits 18 and 20 and containing substantially equal directly-polarized and cross-polarized signal components in which case the output of subtracter 22 is zero.

The additional apparatus shown in the drawing provides for operation of the present invention to display such targets as will return signals containing substantially equal amounts of directly-polarized and cross-polarized components. The output of amplifier 16 is also applied to an input of clipper circuit 48 which limits the maximum amplitude of signals to be handled by the remaining indicator circuits. The output of clipper circuit 48 is applied to threshold circuit 49 which is set to pass signals having amplitudes greater than those which would be passed by either of threshold circuits 18 and 20. Thus, clipper 48 and threshold circuit 49 will pass signals having amplitudes between two limits both of which are higher than the threshold of circuits 18 and 20.

Clipper 51 and threshold circuit 52 which are coupled to the output of amplifier 14 are set to pass the same amplitude band of signals as are passed by clipper 48 and threshold circuit 49. The outputs of threshold circuits 49 and 52 are respectively applied to first and second inputs of adder 50. The resultant output of adder 50, designated Δ(D+X), is applied to the aforementioned second inputs of adders 32 and 34 and ultimately to the intensity control grids of indicators 38 and 42 in a manner previously described.

In the case where large amplitude target signals are returned containing substantially equal amounts of directly-polarized and cross-polarized signals, the beams of cathode ray tubes 38 and 42 will be substantially equally intensified to produce the same neutral (yellow) color as is produced by the insertion of the ΔD signal in both cathode ray tube beam intensifying circuits. However, the former signals will produce a brightness greater than that produced by the ΔD signal inasmuch as the signals passed by clippers 48 and 51 and threshold circuits 49 and 52 have amplitudes greater than those signals passed by limiter 35. Thus, large amplitude target signals containing equal amounts of directly-polarized and cross-polarized components will be displayed on the composite indication of dichroic mirror 42 in a brighter yellow than the pale yellow indication produced by the ground mapping signal ΔD to effectively distinguish said large amplitude target signals from ground clutter.

From the above description it will be seen that the various objects of the present invention have been achieved by the provision of an improved indicator for a diversity polarization radar system. The indicator circuit enables one to discriminate between targets having stronger returns in one or the other of two orthogonal polarization planes. Targets providing a strong return are indicated in colors on one side (reddish) or the other (greenish) of a neutral color (yellow) depending on the predominance of a directly-polarized or cross-polarized component signal and having a purity (all red or green) depending on the relative difference between the amplitudes of the directly-polarized and cross-polarized components. By the provision of threshold circuits, strong targets returning equal amounts of directly-polarized and cross-polarized signals are distinguished from the weaker (ground clutter) signals which likewise contain substantially equal directly-polarized and cross-polarized signal components. The former targets are displayed in a bright neutral color and the latter targets are displayed in a pale neutral color.

It is to be noted that while the ground clutter signal ΔD is shown as being derived from the D output of receiver 10, it alternatively can be derived from the X output thereof.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Radar apparatus comprising means for receiving radar echo pulses of microwave energy, said means including means having two output channels for deriving separate output pulses proportional in amplitude, respectively, to the directly-polarized and cross-polarized components of the received microwave energy, a lin-og amplifier coupled to each of the respective outputs of said means, a subtracter circuit coupled to the outputs of the lin-log amplifiers for producing a signal proportional to the difference between the two lin-log outputs, variable means for eliminating the signals applied to the subtracter means having an amplitude below a controllable threshold level whereby only strong echo pulses are utilized, phase inverting means coupled to the difference signal output of the subtracter means for producing two signals having pulses of opposite sense, first and second amplitude discriminating means for passing strong echo pulses having amplitudes between predetermined levels and adapted to receive a respective output of said lin-log amplifiers, first summing means for additively combining the outputs of said first and second amplitude discriminating means, second and third summing means coupled to a respective output of said phase inverting means and to the output of said first summing means, amplitude limiter means coupled to the output of one of said lin-log amplifiers, fourth and fifth summing means coupled to a respective output of said second and third summing means and to the output of said amplitude limiter means, first and second clipping means respectively coupled to the outputs of said fourth and fifth summing means, a pair of cathode ray indicator tubes having different color-producing phosphor screens, the output of said first clipping means being coupled to the intensity control of one indicator tube and the output of the second clipping means being coupled to the intensity control of the second indicator tube, and means for superimposing the images formed on the screens of the two indicator tubes.

2. Radar apparatus comprising means for receiving radar echo pulses of microwave energy, said means including means having two output channels for deriving separate output pulses proportional in amplitude, respectively, to the directly-polarized and cross-polarized components of the received microwave energy, a lin-log amplifier coupled to each of the respective outputs of said means, a subtracter circuit coupled to the outputs of the lin-log amplifiers for producing a signal proportional to the difference between the two lin-log outputs, means for eliminating the signals applied to the subtracter means having an amplitude below a predetermined threshold level whereby only strong echo pulses are utilized, phase inverting means coupled to the difference signal output of the subtracter means for producing two signals having pulses of opposite sense, first and second amplitude discriminating means for passing strong echo pulses having amplitudes between predetermined levels and adapted to receive a respective output of said lin-log amplifiers, first summing means for additively combining the outputs of said first and second amplitude discriminating means, second and third summing means coupled to a respective output of said phase inverting means and to the output of said first summing means, amplitude limiter means coupled to the output of one of said lin-log amplifiers, fourth and fifth summing means coupled to a respective output of said second and third summing means and to the output of said amplitude limiter means, a pair of cathode ray indicator tubes having different color-producing phosphor screens, the output of said fourth summing means being coupled to the intensity control of one indicator tube and the output of the fifth summing means being coupled to the intensity control of the second indicator tube, and means for superimposing the images formed on the screens of the two indicator tubes.

3. Radar apparatus comprising means for receiving radar echo signals of microwave energy, said means including means having two output channels for deriving separate output signals proportional in amplitude, respectively, to the directly-polarized and cross-polarized components of the received microwave energy, a subtracter circuit coupled to the respective outputs of the receiving means for producing a signal related to the difference between the two output signals, means for eliminating signals applied to the subtracter means having an amplitude below a predetermined threshold level whereby only strong echo signals are utilized, phase inverting means coupled to the difference signal output of the subtracter means for producing two signals of opposite sense, amplitude limiter means coupled to one of the outputs of said receiving means, first and second amplitude discriminating means for passing strong echo pulses having amplitudes between predetermined levels, means for coupling said outputs of said receiving means to respective ones of said amplitude discriminating means, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, a pair of cathode ray indicator tubes having different color-producing phosphor screens, the output of the first summing means being coupled to the intensity control of one indicator tube, and the output of the second summing means being coupled to the intensity control of the second indicator tube, and means for superimposing the images formed on the screens of the two indicator tubes.

4. Radar apparatus comprising means for receiving radar echo signals of microwave energy, said means including means having two output channels for deriving separate output signals proportional in amplitude, respectively, to the directly-polarized and cross-polarized components of the received microwave energy, a lin-log amplifier coupled to each of the respective outputs of said means, a subtracter circuit coupled to the outputs of the lin-log amplifiers for producing a signal proportional to the difference between the two lin-log outputs, phase inverting means coupled to the difference signal output of the subtracter means for producing two signals of opposite sense, first and second amplitude discriminating means for passing strong echo signals having amplitudes between predetermined levels and adapted to receive a respective output of said lin-log amplifiers, amplitude limiter means coupled to the output of one of said lin-log amplifiers, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, a pair of cathode ray indicator tubes having different color-producing phosphor screens, the output of the first summing means being coupled to the intensity control of one indicator tube, and the output of the second summing means being coupled to the intensity control of the second indicator tube, and means for superimposing the images formed on the scrrens of the two indicator tubes.

5. Radar apparatus for receiving radar echo signals of microwave energy, said means including means having two output channels for deriving separate output signals proportional in amplitude, repectively, to the directly-polarized and cross-polarized components of the received microwave energy, a subtracter circuit coupled to the respective outputs of the receiving means for producing a signal related to the difference between the two output signals, phase inverting means coupled to the difference signal output of the subtracter means for producing two signals of opposite sense, first and second amplitude discriminating means for passing strong echo signals having amplitudes between predetermined levels, means for coupling said outputs of said receiving means to respective ones of said amplitude discriminating means, amplitude limiter means coupled to one of the outputs of said receiving means, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, a pair of cathode ray indicator tubes having different color-producing phosphor screens, the output of the first summing means being coupled to the intensity control of one indicator tube, and the output of the second summing means being coupled to the intensity control of the second indicator tube, and means for superimposing the images formed on the screens of the two indicator tubes.

6. Apparatus for displaying information derived from two sources, the information being in the form of signals varying in amplitude over a wide dynamic range, said apparatus comprising a subtracter circuit for deriving an output signal related in amplitude to the difference in amplitude of the two information signals, means for applying the two information signals to said subtracter circuit including means for limiting signals to those exceeding a predetermined threshold level and non-linear amplifying means for reducing the dynamic range of the information signals, phase inverting means coupled to the output of the subtracter circuit for producing two signals of opposite phase, first and second amplitude discriminating means for passing signals having amplitudes between predetermined levels, each being adapted to receive the output of a respective one of said non-linear amplifying means, amplitude limiter means adapted to receive the output of one of said non-linear amplifying means, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, and duochormatic cathode ray indicator means including means for controlling separately the intensities of indication in either of two colors, the outputs of said first and second summing means being coupled, respectively, to said separate intensity controlling means whereby the output of the first summing means controls the intensity of indication in one color and the output of the second summing means controls the intensity of indication in the other color.

7. Apparatus for displaying information derived from two sources, the information being in the form of signals varying in amplitude over a wide dynamic range, said apparatus comprising a subtracter circuit for deriving an output signal related in amplitude to the difference in amplitude of the two information signals, means for applying the two information signals to said subtracter circuit including means for limiting signals to those exceeding a predetermined threshold level for reducing the dynamic range of the information signals, phase inverting means coupled to the output of the subtracter circuit for producing two signals of opposite phase, first and second amplitude discriminating means for passing signals having amplitudes between predetermined levels, means for applying said information signals to respective ones of said amplitude discriminating means, amplitude limiter means, means for applying one of the information signals to said amplitude limiter, first summing means for additively combining the outputs of said amplitude discriminating means, the output of both said amplitude limiter means, and one of the outputs of said phase inverting means, second summing means for additively combining the outputs of said amplitude discriminating means, the output of said amplitude limiter means, and the other output of said phase inverting means, and duochromatic cathode ray indicator means including means for controlling separately the intensities of indication in either of two colors, the outputs of said first and second summing means being coupled, respectively, to said separate intensity controlling means whereby the output of the first summing means controls the intensity of indication in one color and the output of the second summing means controls the intensity of indication in the other color.

8. Apparatus for displaying information derived from two sources, the information being in the form of signals varying in amplitude over a wide dynamic range, said apparatus comprising a subtracter circuit for deriving an output signal related in amplitude to the difference in amplitude of the two information signals, means for applying the two information signals to said subtracter circuit including non-linear amplifying means for reducing the dynamic range of the information signals, phase inverting means coupled to the output of the subtracter circuit for producing two signals of opposite phase, first and second amplitude discriminating means for passing signals having amplitudes between predetermined levels, each being adapted to receive the output of a respective one of said non-linear amplifying means, amplitude limiter means coupled to one of said non-linear amplifying means, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means, and the other output of said phase inverting means, and duochromatic cathode ray indicator means including means for controlling separately the intensities of indication in either of two colors, the outputs of said first and second summing means being coupled, respectively, to said separate intensity controlling means whereby the output of the first summing means controls the intensity of indication in one color and the output of the second summing means controls the intensity of indication in the other color.

9. Apparatus for displaying information derived from two sources, the information being in the form of signals varying in amplitude over a wide dynamic range, said apparatus comprising a subtracter circuit for deriving an output signal related in amplitude to the difference in amplitude of the two information signals, means for applying the two information signals to said subtracter circuit, phase inverting means coupled to the output of the subtracter circuit for producing two signals of opposite phase, first and second amplitude discriminating means for passing signals having amplitudes between predetermined levels, means for applying said information signals to respective ones of said amplitude discriminating means, amplitude limiter means, means for applying one of the information signals to said amplitude limiter, first summing means for additively combining the outputs of both said amplitude discriminating means, the output of said amplitude limiter means, and one of the outputs of said phase inverting means, second summing means for additively combining the outputs of both said amplitude discriminating means, the output of said amplitude limiter means and the other output of said phase inverting means, and duochromatic cathode ray indicator means including means for controlling separately the intensities of indication in either of two colors, the outputs of said first and second summing means being coupled, respectively, to said separate intensity controlling means whereby the output of the first summing means controls the intensity of indication in one color and the output of the second summing means controls the intensity of indication in the other color.

* * * * *